United States Patent [19]

Nemetz

[11] 4,436,817

[45] Mar. 13, 1984

[54] METHOD AND APPARATUS FOR AEROBIC DECOMPOSITION OR DRYING OF ORGANIC WASTE MATERIAL

[76] Inventor: Herbert Nemetz, Bleichstrasse 10, 6369 Schoeneck Hess 1, Fed. Rep. of Germany

[21] Appl. No.: 419,010

[22] Filed: Sep. 16, 1982

Related U.S. Application Data

[62] Division of Ser. No. 181,953, Aug. 27, 1980, Pat. No. 4,384,877.

[30] Foreign Application Priority Data

Sep. 15, 1979 [DE] Fed. Rep. of Germany ....... 2937390
Nov. 30, 1979 [DE] Fed. Rep. of Germany ....... 2948176

[51] Int. Cl.³ ............................................. C12M 1/04
[52] U.S. Cl. .................................... 435/313; 414/156; 422/184; 71/9
[58] Field of Search ................ 414/156, 176; 435/287, 435/299, 313; 71/9; 422/184

[56] References Cited

U.S. PATENT DOCUMENTS

| 646,820 | 4/1900 | Fowlis ................................. 414/156 |
| 4,384,877 | 5/1983 | Nemetz .................................... 71/9 |

FOREIGN PATENT DOCUMENTS 56-37912 4/1981 Japan .................................. 414/156

*Primary Examiner*—Ferris H. Lander

*Attorney, Agent, or Firm*—W. G. Fasse; D. H. Kane, Jr.

[57] ABSTRACT

A process for aerobic composting or drying of organic waste materials in a composting bin and apparatus for carrying out the process. The composting bin is formed by one or more elongate composting passageway chambers which can be aerated or vented and heated. Each chamber encloses in sequence an intake zone, shaping zone, reaction zone, and discharge or transfer zone. Material is fed loosely through an opening into the intake zone in successive substantially equal portions or charges. A clearing element at the intake end of the chamber intermittently pushes each successive portion through the shaping zone, against the preceding portion, and through the reaction zone of the chamber. Residence time in the compost bin is sufficient for complete composting or other purposes before discharge or transfer. In the case of a bin with two or more chambers the chambers are arranged at different levels one below the other. The bins are oppositely oriented so that the transfer of material from an upper bin feeds material to the intake zone and the steps are repeated to completion of decomposition. For automatic process control the reaction zone is divided into separate sections for separate venting and analysis of reaction gases by section. Separate control of aeration and heating by section is also provided in response to the gas analysis thereby provided selective optimim conditions for completion of aerobic decomposition.

22 Claims, 10 Drawing Figures

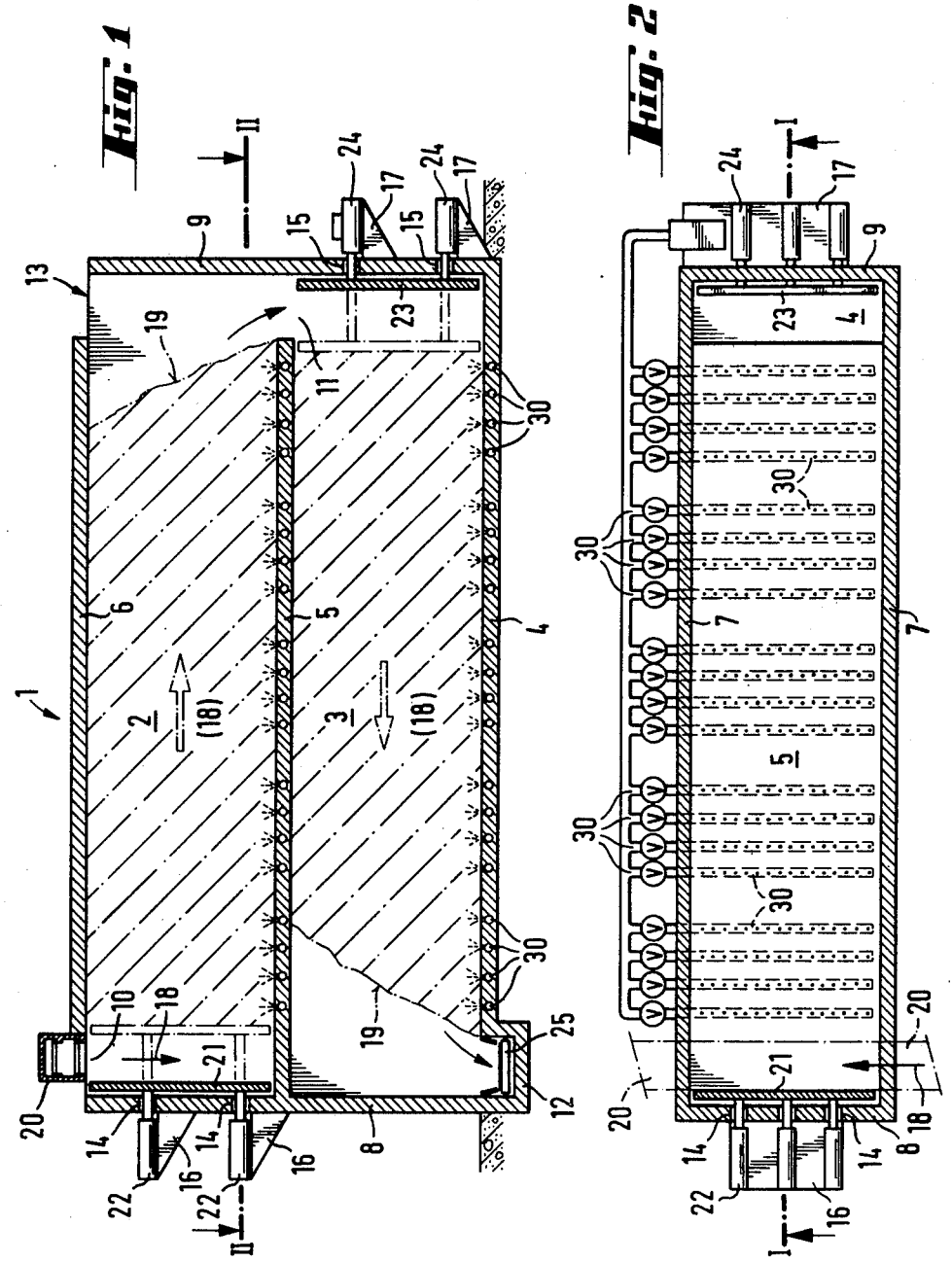

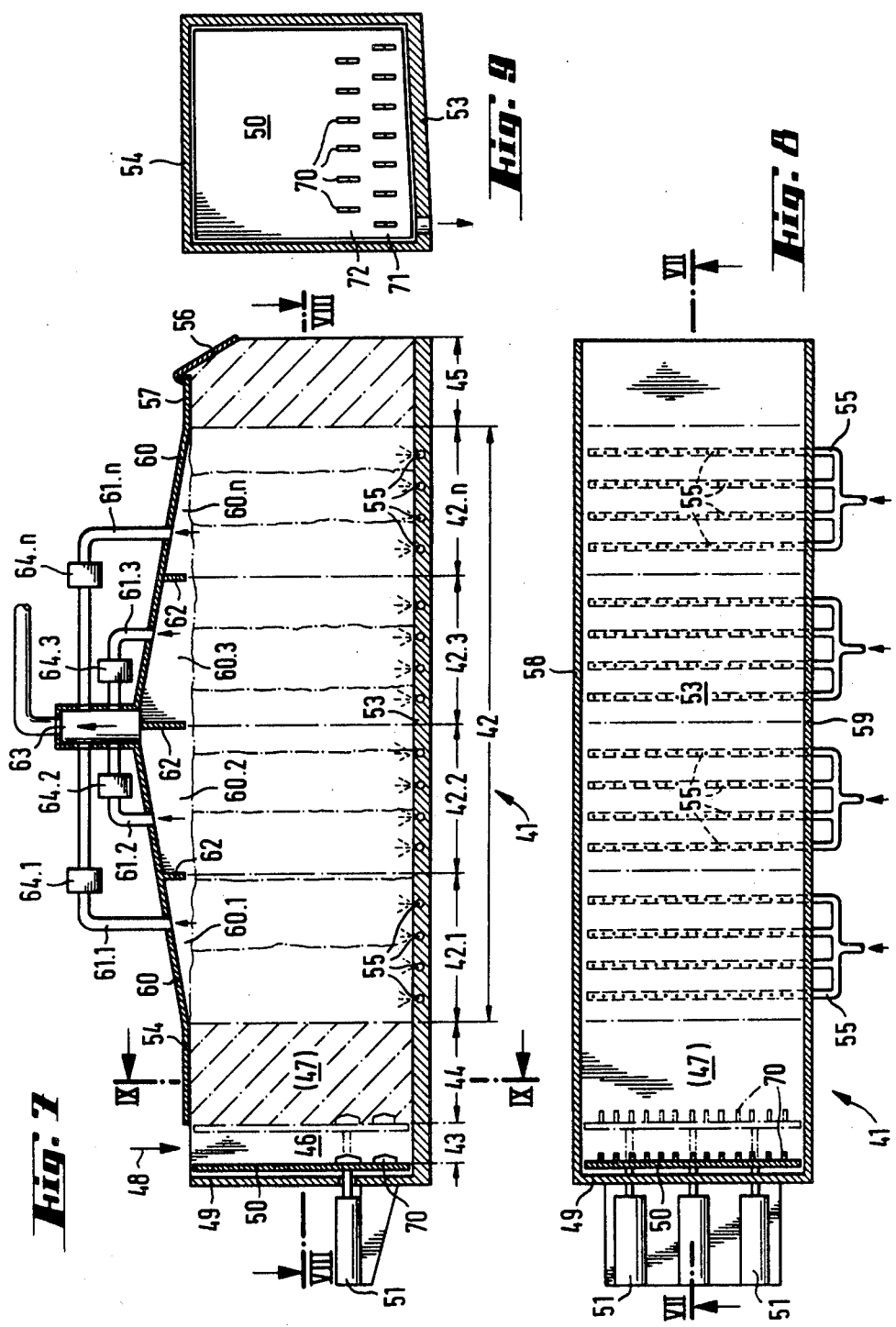

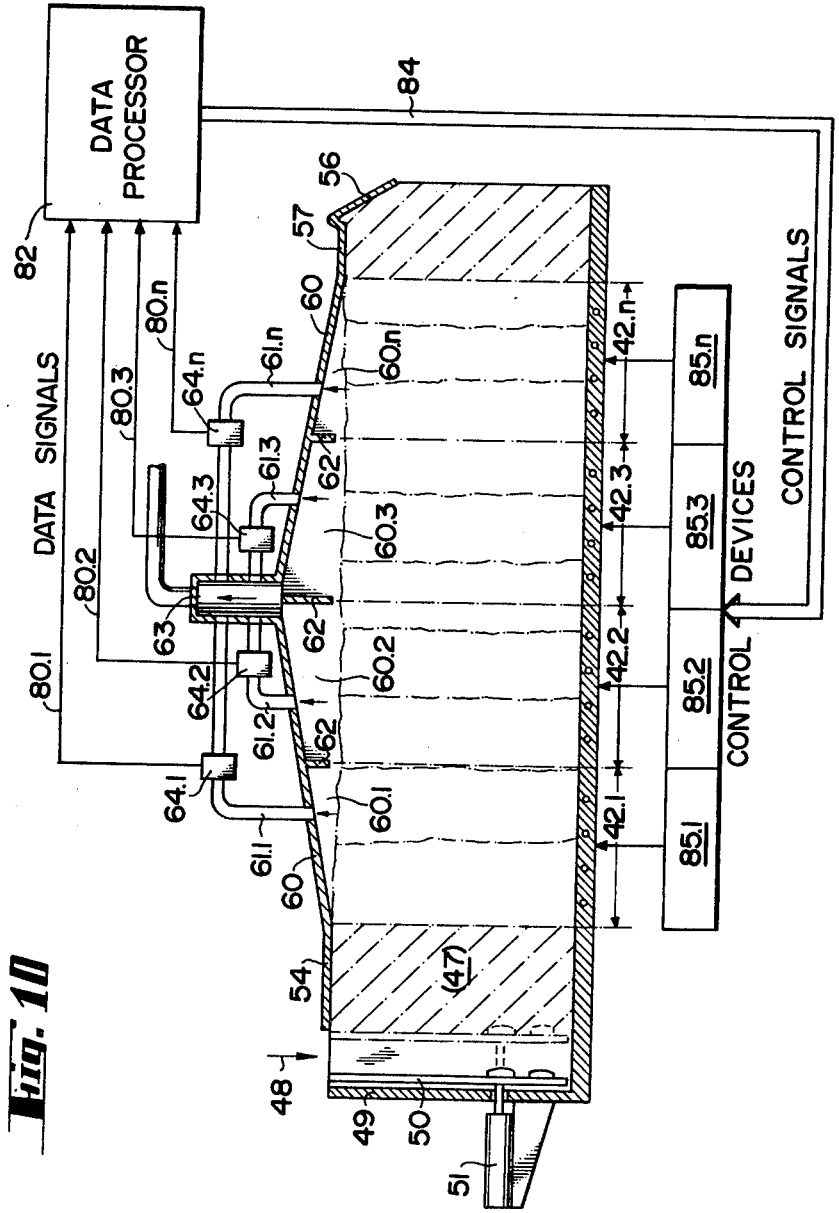

METHOD AND APPARATUS FOR AEROBIC DECOMPOSITION OR DRYING OF ORGANIC WASTE MATERIAL

CROSS REFERENCE TO RELATED APPLICATIONS

Applicant claims the convention priority dates of German Patent Application No. P 2,937,390.8; filed on Sept. 15, 1979 and German Patent Application No. P 2,948,176.3; filed on Nov. 30, 1979 for the present application. This application is a divisional of Ser. No. 181,953 filed Aug. 27, 1980 now U.S. Pat. No. 4,384,877, May 24, 1983.

BACKGROUND OF THE INVENTION

The invention relates to a process for aerobic composting and/or drying of organic waste materials in a composting bin and apparatus for carrying out the process. The bin is formed by one or, if appropriate, several composting chambers which can be aerated or vented and heated. In the case of a bin with two or more chambers, the chambers are arranged at different levels one below the other. The material is fed to the bin by dumping it in loosely, and is conveyed through the bin. After a residence time determined by the time required for composting or decomposition as a rule, this time is about ten days, the material is discharged from the bin.

These processes and this equipment are essentially used for the production of compost. Micro-organisms, such as bacteria, mold fungi, protozoa, nematodes or actinomycetes participate in the composting process, and the aerobic decomposition can be taken through to a total mineralization of the organic materials.

Decomposition or rotting depends essentially on the oxygen content, water content, C/N nutrient content, temperature and pH of the material to be converted. With a sufficient air supply, it proceeds virtually without odors, in particular, at temperatures of 60° to 90° on average.

In view of the increasing waste disposal problems, mixtures of garbage and effluent sludge are composted to an increasing extent.

In mixtures of these components, it is possible in some cases to set an even higher C:N ratio than the 25:1 to 30:1 ratio which is favorable for the rotting or decomposing organisms.

The tests by EAWAG in Rueschlikon confirm (compare reprint of "Neue Zuericher Zeitung", Technik supplement of June 18, 1958), the finding that sewage sludge can be added in equivalent quantitites to the garbage.

Because of the increasing importance of the waste disposal problem, coupled with concern over pollution of the environment, processes which in themselves are suitable in principle, are in the end no longer usable nowadays. For example, the "Baden-Baden process" used earlier, in which open rotting pits are provided, in particular pits which are aerated by means of aeration channels, does not meet the hygienic requirements customary today.

Partial rotting has been achieved with the fermenter drum of the Dano-biostabilizer by using this as a fermenter cell.

In this drum relatively good, thorough mixing and loosening of the material does take place when air is supplied continuously. The result is a rotted or composted material which is then stored in open pits, even though for a shorter period (compare the printed publication already quoted).

The likewise known "digester evolution" relates to a virtually closed, upright standing, cylindrical fermenter cell with levels built in, the comminuted material being charged to the upper level and being mixed and conveyed through the levels by means of a vertical rotary shaft fitted with arms and colters.

The power consumption for transporting the material through the individual levels of the fermenter cell is relatively high and the equipment is very prone to wear and breakdown, so that economic considerations make it doubtful whether the compost treated in this way can be marketed widely.

The likewise known introduction of layers of material to be composted into aerated circular silos requires complicated discharge devices such as have been disclosed, for example, in German Utility Model No. 7,329,120.

Devices of this type are intended to enable the rotted material to be discharged uniformly over the cross-section of the vessel, and to permit ready placement of the cutting tools or worm screws, which are subject to relatively extensive wear.

It is not easy to solve these problems and, in many cases, it is acknowledged in the result that compromises are necessary.

This situation in the end makes the principle of circular rotting silos questionable, at least as far as certain sizes and zones are concerned.

Moreover, it is known from German Offenlegungsschrift No. 2,890,344, to charge the material to a continuous conveyor system arranged in an aeration reactor in several levels one below the other. The dumping of the material thus obtained is only loose and essentially can initiate only drying, but not an effective biological reaction in the sense of complete decomposition or rotting since, as a rule, the air flows through the dumped layer of material on the paths of least resistance, without effectively and uniformly coming into contact with the majority of the surfaces in the material.

OBJECTS OF THE INVENTION

In view of the above it is the aim of the invention to achieve the following objects singly or in combination:

to provide a continuous process composting system with intermittent input feed of organic waste material and intermittent output of matured compost;

to provide a continuous process composting system which assures a substantially complete aerobic decomposition of organic waste material virtually without odors and in compliance with hygienic requirements and environmental standards;

to provide a continuous process aerobic composting system which flexibly responds to changing characteristics through the system during the course of the composting process and automatically optimizes environmental parameters through individualized portions of the system; and to minimize power consumption for transport and mixing of organic waste material in a composting system, minimizing mechanical effort and wear and optimizing utilization of oxygen.

SUMMARY OF THE INVENTION

In order to achieve these objects the invention provides that the material is fed intermittently at each interval of time, via a feed point, in substantially equal portions into the intake zone of a level of the bin forming a tunnel-like reaction chamber or passageway chamber. After the feeding of a portion of the material has been completed, this portion is pushed forward, sliding on its bin support, by a clearing element through a shaping ante-chamber or a corresponding chamber section, in the longitudinal direction of the chamber. The intake zone is completely cleared, and subsequently the clearing element is moved back again into its starting position. After feeding at least one preceding portion, the next portion is moved up against this previously fed portion, both portions thus being compacted. In the further stepwise passage through the reaction space of the chamber each portion is aerated and/or heated in its compacted position. After complete filling of the chamber or chambers, with a plurality of portions or charges sequentially fed into and pushed through the bin chamber or chambers, one against another, a discharge portion with a volume corresponding to that of the feed portion is discharged each interval of time from the discharge zone.

Due to the intermittent feeding of the material loosely dumped in preferably daily portions, it is possible to convey them from the feed zone into the closed zone of the chamber over a short conveying path, with relatively low power consumption.

Admittedly, the freshly fed material must be moved up against the portion of material previously fed, while compacting and simultaneously shaping the latter to correspond to the inlet cross-section of the chamber, and transporting it. However, this compaction is intended and essential to the invention, since this action makes it possible to obtain an optimum uniform density of material and hence, relative to the cross-section, a uniform passage and flow resistance for the air.

The elasticity within the column of material, however, prevents any overloading of the means which drive the clearing element forward, and, when the bin chamber is completely filled, a constant maximum drive power is required per length of stroke. The magnitude of this drive power must be considered with regard to the lubricating effect of the material, given by the water content, fats and the like, in conjunction with the friction-reducing effect between the material and the chamber walls. The lining of the latter may be provided with agents which promote sliding, and with means for aeration and, if appropriate, heating. In this connection, it should also be noted that the length of stroke imparted to the clearing element can be spread over a relatively long time and this length can thus be covered with relatively little power.

When several chambers are arranged one below the other, additional thorough mixing caused by gravity also takes place on transfer from the upper into the lower chamber, and this promotes uniform rotting.

The usual loss in volume of the material during its drying and rotting, usually amounting to about 30%, is taken into account by appropriately adjusting the dimensions of the reaction chamber, that is to say as a rule by extending the latter correspondingly, so that volumetrically equal feeding of raw material and discharge of completely rotted material are accomplished.

With respect to venting or the removal of the reaction gases produced, it is to be noted that the reaction gas produced is sectionally extracted transversely to the direction of passage of the material and that the quantity of reaction gas extracted is analyzed as appropriate. The result of the sectional analysis is utilized for controlling the aeration and the temperature.

As a result of this measure, the process for the aerobic treatment of the material fed can be operated in an optimum manner with respect to the quality requirements and also with optimum economy.

The equipment required for carrying out the process envisages firstly that the particular portion of material can be fed into the chamber via a slot provided in the roof in the zone by means of a tray conveyor transversely to the direction of advance of the portion of material, the tray conveyor being designed to discharge downwards and substantially uniformly over the entire width of the slot.

If the equipment is of multi-level construction, the portion of material fed can be transported by the stroke of a clearing blade, acting as a clearing element, in the upper chamber. If the upper chamber is already filled, the material can be conveyed in portions to the chambers located underneath via the transfer slot which extends, likewise transversely to the direction of advance, in the zone of the end wall.

By means of a further clearing blade located on the inside of the end wall and acting as a clearing element, the portion of material can be moved to the discharge provided in the floor, likewise transversely to the direction of advance, in the zone of the opposite end wall. Aeration and heating of the individual portions of material, conveyed intermittently through the chambers, are provided individually, corresponding to the course of the biological reaction, in groups by aeration devices in an arrangement distributed according to the dimensions of the support surfaces for the individual portions of material.

Equipment of this type makes it possible to effect the individual steps of the intended course of the process, and the design which makes intermittent aeration and heating possible permits a particularly economical procedure.

In fact, this design makes it possible not only individually to aerate the individual daily portions corresponding to the progress of the biological reaction, but also to take into account, as necessary, compositions of individual daily portions, which may widely deviate from the average, by specially controlling the aeration and heating.

With respect to multi-level construction of this equipment, it should be noted that, if it is formed by any desired number of chambers located one below the other, the clearing elements of each chamber can be effectively actuated successively from top to bottom in the direction opposite to that of the clearing element of the particular chamber located above, when the next lower clearing element in each case has been returned to its discharge position.

On clearing of the intake zone, these relationships ensure that the requisite part of the space in the transfer zone of the next lower chamber is in fact free for transferring the portion, present in the end position of the upper chamber, into the lower chamber.

Regarding the design of the reaction chamber(s), it is envisaged that the latter essentially has or have an approximately square to rectangular open cross-section and is or are arranged to run mainly horizontally.

For a further reduction in the friction on transporting the material in the chambers, an arrangement can be provided in which, if the chambers are of multi-level construction, they are inclined toward one another, forming an acute angle, in the transfer zone.

In this connection, it must be considered for each case whether such an increased construction expenditure is justified in view of the reduction to be achieved in the power required for pushing material forward.

To simplify monitoring, it is advantageous when, distributed over the length of the compost bin, various orifices for process control, in particular for controlling aeration, are provided in the side walls.

For conveying the material, it is advantageous when the advance of the clearing blades, acting as a clearing element, and their retraction are effected by threaded spindles and/or hydraulic cylinders which are located on the end walls of the compost bin.

The equipment for carrying out the process with sectional extraction of the reaction gas, analysis of the latter and evaluation of the analytical result comprises the features that the cross-section of the shaping ante-chamber is closed on all sides and the actual reaction space adjoins this ante-chamber.

This reaction space, up to a discharge zone of likewise closed cross-section for the no longer reacting or reactive material, is closed off by a gas-collection hood. This hood is subdivided into individual reaction sections by bulkheads which reach from above into the space down to the upper boundary line of the compacts of material formed in the ante-chamber.

Corresponding to the reaction sections, adjustable fuel gas feed elements arranged in groups are provided on the floor of the reaction space, each reaction section forming separate extraction sections in its upper zone.

These extraction sections are each connected via separate lines, fitted with connecting means for gas analysis instruments, to the gas collection space provided with an outlet line. The gas analysis instruments to be connected are located upstream of the entry of the lines into the gas collection space, so that the results can be evaluated.

On the other hand, the result of this design is that the material which is to be fed intermittently in virtually equal amounts is subjected in each case to a compression on clearing of the intake zone, when the reaction space is already partially filled, that is to say after normal operating conditions have been established. After feeding of the next charge and shaping the latter, the previously fed portion is passed as a uniformly compressed compact or molding from the ante-chamber into the actual reaction space and, in the latter, is transported stepwise through the reaction space into the actual discharge zone under the action of the succeeding material.

Compared with the known systems, this fact alone represents a great advantage, since different residence times due to non-uniform discharge are completely eliminated. The material is passed uniformly through the cross-section of the reaction space without formation of residues, corners or the like.

The sub-division of the actual reaction space by means of bulkheads into reaction sections which can be individually controlled and heated or aerated, the separate extraction of the reaction gases and the measurement and analysis of the latter enable the entire coarse of the reaction to be efficiently controlled over the whole length of the reaction chamber.

The equipment for carrying out the process thus makes it possible to ensure that the stated objects are fully met.

With respect to the control system, it is envisaged that the instruments for carrying out the gas analysis are connected as controllers to controlling devices for the control of temperatures, throughput rates and/or compositions of the hot gases to be fed to the material via the hot gas feed elements. This measure enables the course of the reaction to be automatically controlled.

To facilitate the penetration of the hot gases into the fresh material compact when the latter is transferred into the reaction space, it is envisaged that the clearing blade(s) on its or their surface(s) pointing to the side of the material, is or are formed with bars arranged in a row of bars at equally spaced intervals and that this row of bars can be associated with at least one further row of bars at a spacing from the preceding row, the gaps being staggered.

The spacing of the rows of bars and the height of the bars are selected so that the total height of the area, covered by the bars, of the particular clearing blade is about one third of the height of the compacting blade.

To obtain automatic drainage, that is to say drainage by gravity, it is envisaged that the floor has a slope of about 10%, transversely to the direction of advance of the material.

An even better utilization of heat is obtained when, to control the biological reaction, additional heat exchangers are provided, and the heat exchangers carrying a heat transfer medium are preferably formed by a smooth metallic skin, to which a metal sheet with outward pointing profiles is joined, and wholly or partially delimit the cross-section of the chambers.

A modification in the use of the process envisages that it is employed for at least partial carbonization of the organic waste materials.

BRIEF FIGURE DESCRIPTION

The equipment according to the invention for drying and/or degassing and/or decomposition of organic waste materials is explained in more detail in an illustrative example by reference to the attached drawings in which:

FIG. 1 shows an elevation of two-level rotting equipment, along the section I—I in FIG. 2;

FIG. 2 shows the equipment according to FIG. 1 in plan as the section II—II;

Figure 4:
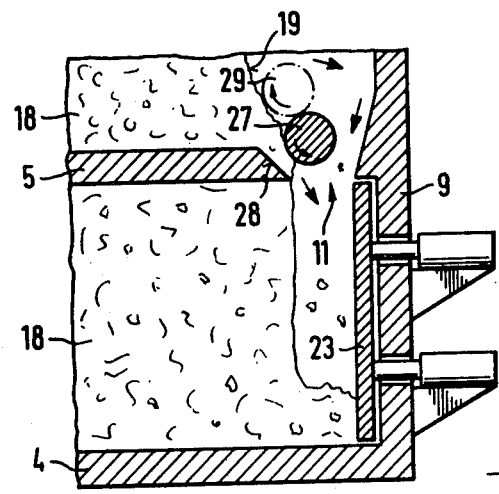
Figure 5:
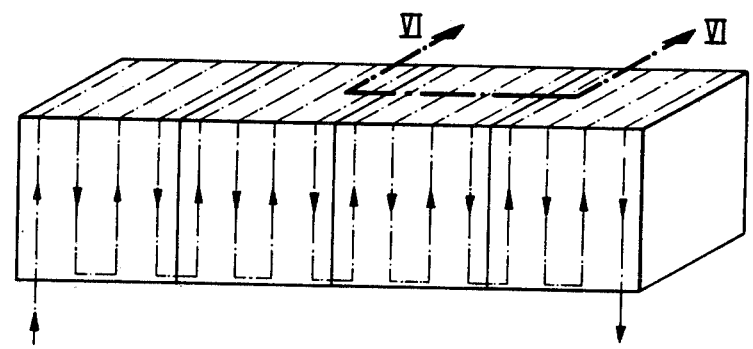
Figure 6:
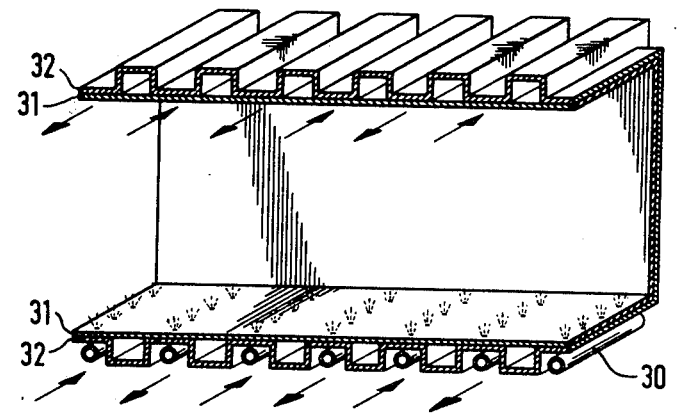

FIG. 4 shows the arrangement of a shredding roller for loosening in the transfer zone, in order to assist mixing of the rotting material of the particular daily charge to be transferred. The shredding roller delivers downwards; above the shredding roller, a second shredding roller rotating in the opposite direction is drawn in dashes; in some cases, it can be advantageous to use both rollers in combination;

FIG. 5 shows a diagrammatic perspective view of a heat exchanger which is designed as a slideway and the cross-section of which corresponds to the cross-section of the chamber and which enables excess process heat to be removed. The bottom of the two heat exchangers provided for each chamber is at the same time equipped with devices for controllable aeration;

FIG. 6 shows a detail section VI—VI from FIG. 5;

FIG. 7 shows an elevation of equipment which differs from FIGS. 1 to 6 and which relates to a single level embodiment with sectional extraction, wherein the reaction space extends substantially horizontally, the feed of material, the means of advancing the material and the discharge of residual material, coke and slag, the separation of these substances, as far as necessary, not being a subject of the description; the covering of the reaction space by an exit gas hood which rises toward the center, is sectionally divided and has in each case a separate gas outlet to the gas collection space, and, corresponding to the individual sections of the gas collection hood, got gas feed elements which project into the floor and are likewise sectionally grouped, as a section VII—VII through FIG. 8;

FIG. 8 shows equipment according to FIG. 7 in plan, along the section VIII—VIII through FIG. 7;

FIG. 9 shows the section IX—IX through FIG. 7, viewed in the direction of the end face of the clearing blade acting as the advancing means. The lower zone of the clearing blade is provided with ribs which point in the direction of advance and facilitate the introduction of the hot gases into the material; and FIG. 10 is a block diagram of a process control arrangement for the compost bin of FIG. 7.

DETAILED DESCRIPTION OF PREFERRED EXAMPLE EMBODIMENTS AND OF THE BEST MODE OF THE INVENTION

The equipment 1 is designed for a daily garbage delivery of about 20 m$^3$ and comprises an upper composting chamber 2 and a lower composting chamber 3, the total capacity of which enables 10 daily charges of garbage to be introduced. This garbage moves through the equipment in sectional passage through both chambers with a daily advance corresponding to one daily charge (charge=portion). This results in internal dimensions for the individual chambers 2/3, located one above the other, of about 12×3×3 m in each case, the total height of the equipment 1 being about 7 m, taking into account the thickness of the floor 4, intermediate floor 5 and roof 6.

The side walls are marked as item 7, the end wall on the feed side is marked as item 8 and the end wall on the transfer side is marked as item 9.

Further constructional features of the equipment 1 are the feed slot 10 located in the roof 6, the transfer slot 11 located in the intermediate floor 5, the discharge pit 12 formed in the floor 4 of the lower chamber 3 on the side of the end face, an observation and repair slot 13 provided in the rear of the upper chamber 2. On the feed side in the upper chamber 2 and on the transfer side in the lower chamber 3, passages 14/15 are provided in the end walls 8 and 9 for the introduction of pusher elements which are to be described later and for the arrangement of which the consoles 16 and 17 are provided on the two end walls 8 and 9.

The composting or rotting equipment can be built as a steel structure or concrete structure or the like.

This may suffice to describe the overall construction of the equipment.

The material 18 to be decomposed or rotted is fed in daily portions into the chamber 2 via the feed slot 10 by the tray conveyor 20 which discharges downwards. In the feed zone, a clearing blade 21 is provided which, in the feeding position, lies against the inside of the end wall 8 and the dimensions of which correspond to the cross-section of the chamber. The clearing blade 21 can be actuated by the hydraulic cylinders 22 which are located on the consoles 16 and the piston rods of which reach through the passages 14. The stroke of the blade 21 corresponds to the width of the feed slot 10.

On the inside of the end wall 9, analogously to the clearing and advancing combination 21/22, a clearing blade 23 is also formed which can be actuated by hydraulic cylinders 24 located on the consoles 17 and the possible stroke of which corresponds to the width of the transfer slot 11.

On actuation of the clearing blade 23, the corresponding volume of material is removed by the tray conveyor 25 located in the discharge pit 12.

Regarding the functioning of the system, it should be stated here that the material 18 is fed as a daily portion through the feed slot 10 while the clearing blade 21 is retracted. After the end of the feeding, the belt drive is locked and the material fed in is conveyed in accordance with the stroke of the cylinders 22. A corresponding volume of the material 18, which has then already been stored for five days, is fed correspondingly through the transfer slot 11 into the lower chamber 3, while the clearing blade 23 is retracted.

Each time when this five day old material is transferred into the lower chamber 3, it is mixed by the motion due to gravity. After transfer has ended, the clearing blade 23 corresponding to the width of the transfer slot 11 is pushed forward and at the same time the tray conveyor 25, which is located in the discharge pit 12 is started up. The apparatus discharges a volume, approximately equivalent to the transfer volume, of rotting material which has by then been stored for ten days.

In order to avoid further material dropping in the zone of transfer while the clearing blade 23 is pushed forward, and hence to avoid an obstruction to the retraction of this blade to the wall 9, a folding flap 26, hinged to the inside of the wall 9, is also joined pivotally to the clearing blade 23.

While the clearing blade 23 is pushed forward, this folding flap 26 prevents with absolute certainty any penetration of material 18 between the wall 9 and the blade 23, so that the blade 23 can always be retracted again into its starting position.

The loosening which takes place during the transfer of the material into the lower chamber 3, can be assisted by a shredding roller 27 located in the floor 5 in the zone of the slot 11. The slot 11 is delimited upwards by a slop 28 in the intermediate floor 5, and the shredding roller 27 can be driven, in this case anti-clockwise, that is to say to draw material into the slot 11. If there are difficult mixing problems, it is advisable, as shown in dashes, also to provide a second shredding roller 29 above the shredding roller 27. The second roller must be drivable in the opposite direction, that is to say in this case clockwise, in order to remove material from the heap 19 and to throw this material against the inside of the wall 9.

The portions 18 of material held in storage are to be aerated via controllable, individually adjustable aeration devices 30 which are correspondingly arranged in groups, that is to say the oxygen required for initiating the biological reaction is introduced via these devices.

To keep the advancing force required within reasonable limits, it is advantageous to provide the two chambers 2 and 3 with a smooth skin, this skin 31 being formed by a stainless steel sheet and this surface being covered on the outside by a ribbed profiled countersheet 32, and a heat transfer medium being passed through the ribs, usually with individual zones connected in series.

Referring to FIGS. 7 to 9, the tunnel reactor 41 is charged via the material feed 48, while the advancing means consisting of the clearing blade 50 and the clearing blade drive 51 (pressure cylinder) are retracted to the boundary wall 49.

After feeding a portion 46 of material, with the reaction space 42 filled, the material present in the feed zone 43 is moved against the portion 46 of material, which has already been introduced into the ante-chamber 44 and compacted, and is thus likewise compacted. The previously compacted material and the partially drained material are transferred into the first reaction section 42.1 of the reaction space 42. Regarding the design of the ante-chamber 44 and the feed zone 43, it should be noted that the floor 53 is slightly inclined toward one side transversely to the direction of advance of the material in order to enable the material to be pre-drained in a simple manner. The ante-chamber 44 is also closed off upwardly by a roof 54 delimiting the form of the material, so that the volume of material, delivered from the ante-chamber 44 into the reaction space 42, is to be regarded approximately as an essentially loosely bonded portion 47 of material.

This bonded portion 47 of material, that is, compact 47 of material, now undergoes an intermittent advance with each new addition of a portion 46 of material into the ante-chamber 44. Each portion is caused to react, and thus to be degassed, by hot gases which are progressively introduced through hot gas feed elements 55 sectionally arranged at approximately equal intervals.

At the end of the reaction space 42, the residual material consisting of compost or coke and essentially mineral slag passes into the discharge zone 45 and is discharged from here by a device which is not shown, with, as far as necessary, simultaneous separation of the individual components, that is to say compost, slag and coke. The discharge zone 45 can be controlled by the flap 56 and is otherwise closed off by the roof 57 of a design corresponding to that of the roof 54.

Between the roofs 54 and 57 and the side walls 58 and 59, the gas collection hood 60 is located, which has a shape rising from the said boundary lines 54–57, 58–59 to the gas collection space which extends, transversely to the direction of advance, in the center of the gas collection hood and has a substantially rectangular cross-section and contains the outlet 63.

The gas collection hood 60 is sub-divided by bulkheads 62 into extraction sections 60.1 to 60.n corresponding to the reaction sections 42.1 to 42.n and to the hot gas feed elements 55 arranged sectionally in the floor of the reaction space 42, each extraction section being connected by separate pipelines 61.1 to 61.n to the gas collection space with the outlet 63.

Gas analysis instruments 64.1 to 64.n are located respectively in the separate pipelines 61.1 to 61.n. The measured values in the form of data signals 80.1 to 80.n are passed on by these instruments 64.1 to 64.n to the data processor 82, as shown in FIG. 10. Processor 82 in each case provides the control signals 84 for the temperature and throughout control devices 85.1 to 85.n to control the hot gas feed elements 55 acting in these sections 42.1 to 42.n The gases extracted from the gas collection space 63 are partially recycled to the hot gas circulation and partially condensed, but this further utilization is not intended to be a subject of this description.

Figure 3:
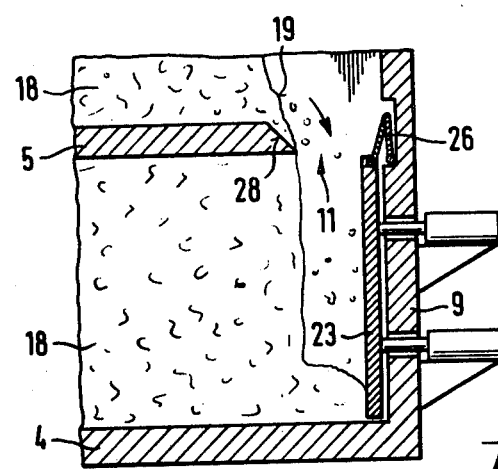
FIG. 3 shows the covering of the transfer opening from the upper into the lower chamber; this covering closes the transfer opening when the transfer zone is cleared by the lower clearing blade.

The clearing blade 50 illustrated by FIG. 1 to FIG. 3 is equipped with vertical bars 70 on its surface pointing to the side of the material. These bars 70 are arranged at intervals uniformly distributed over the width of the clearing blade 50 and have a height of about 10% of the height of the clearing blade. The row 71 of bars thus formed is associated with a second row 72 of bars, with the gaps staggered, at such a distance that the total height of the two rows 71/72 of bars, including the spacing in between, amounts to about one third of the height of the clearing blade.

These bars 70 form notches in the portions 47 of bonded material and facilitate the penetration by the hot gases.

Although the invention has been described with reference to specific example embodiments, it is to be understood, that it is intended to cover all modifications and equivalents within the scope of the appended claims.

What is claimed is:

1. A composting bin apparatus for aerobic decomposition and drying of organic waste materials comprising: at least one elongated composting passageway chamber comprising in sequence an intake zone, shaping zone, reaction zone, and discharge or transfer zone; said intake zone comprising an opening at the top of the chamber; means for intermittently feeding substantially equal portions or charges of material into the intake zone through said opening; said shaping zone adjoining the intake zone and comprising an ante-chamber closed on the sides for shaping a portion of material received from the intake zone; clearing element means mounted at the intake zone end of the chamber, said clearing element constructed and arranged for reciprocating extension and retraction for pushing and sliding a portion or charge of material received at the intake zone into the shaping zone and for stepwise pushing and compacting successive portions against each other and through the reaction zone; means for extending and retracting said clearing element over a stroke the dimension of said intake zone; said reaction zone comprising an elongate passageway adjoining the shaping zone; means for aerating the material in separate sections spaced along the reaction zone; said discharge or transfer zone adjoining the reaction zone and comprising opening means at the bottom of the chamber for intermittently discharging or transferring portions from the chamber as the portions pass through the reaction zone.

2. The composting bin apparatus of claim 1, further comprising means for heating the material in said separate sections along the reaction zone.

3. The composting bin apparatus of claim 1, comprising a plurality of chambers located one below the other in a multi-level construction of successive upper and lower chambers, the discharge or transfer zone and opening of an upper chamber positioned over the intake zone and feed opening of a lower chamber, said chambers oriented in opposite directions, the clearing elements of each chamber operative successively from top to bottom in alternately opposite directions, each upper clearing element operative only when the next lower clearing element is in its retracted position.

4. The apparatus of claim 1 or 3, wherein each chamber is formed with rectangular cross sections and is oriented substantially horizontally.

5. The apparatus of claim 3, wherein the multiple chambers are arranged with each adjacent pair inclined toward one another forming an acute angle with apex at the junction of an upper chamber transfer zone and lower chamber intake zone.

6. The apparatus of claim 1, wherein the means for aerating the material in separate sections along the reaction zone comprise a plurality of orifices distributed in sidewalls along the length of the chamber.

7. The apparatus of claim 1, wherein the means for extending and retracting said clearing element comprises hydraulic cylinders located at the intake zone end of the composting chamber.

8. The apparatus of claim 1, wherein the means for extending and retracting said clearing element comprises threaded spindle means located at the intake zone end of the composting chamber.

9. The apparatus of claim 1, wherein the reaction zone comprises gas collection hood means over the reaction zone portion of said chamber, said hood means subdivided into a plurality of hood venting sections along the length of the reaction zone coinciding with said separate aeration or heating sections, by partitions transversely across the longitudinal direction of travel of the material extending from said hood to the upper surface of the contiguous portions passing through the reaction zone; and further comprising a separate venting line coupled with each venting section along the reaction zone; gas analysis instrument means coupled with each said separate venting line for analyzing separately the reaction gas generated by each separate section; gas collection space means for receiving the outputs from said separate venting lines downstream from the gas analysis instrument means, said gas collection space provided with an outlet line for recycling reaction gases of the composting process.

10. The apparatus of claim 9, further comprising control means coupled to the outputs of said gas analysis instrument means and operatively coupled for separately controlling the aeration or temperature of the portions of material in the respective separate sections along the reaction zone.

11. The apparatus of claim 1 or 3, wherein the clearing element means comprises a plane surface for pushing material fed into the intake zone, said plane surface formed with bars arranged across the plane surface and extending outwardly to form aerating spaces in each portion of material as it is pushed and compacted by said clearing element.

12. The apparatus of claim 11, whrein said bars are arranged in offset rows of bars, each row comprising bars at equally spaced intervals.

13. The apparatus of claim 11, wherein said bars are distributed substantially over the lower one third of the height of the clearing element.

14. The apparatus of claim 1, wherein said chamber is formed with a floor having a slope of about 10% from the horizontal in a direction transverse to the direction of intermittent advance of the material.

15. The apparatus according to claim 1 or claim 2, further comprising heat exchange means, said heat exchange means comprising first smooth metallic heat transfer sheet means lining portions of the chamber along the reaction passageway and second ribbed and profiled metallic sheet means joined with said first metallic sheet means forming channels extending transversely of the direction of passage of material through the chamber.

16. The apparatus of claim 1, further comprising conveyor means constructed and arranged for delivering material to the intake zone opening of the chamber in a direction transverse to the direction of advance of the material portions in the chamber, said conveyor means further arranged to deliver material downwards and substantially uniformly over the entire width of the intake zone opening.

17. The apparatus of claim 3, further comprising flap means operatively coupled over the intake zone opening of each lower chamber for blocking the intake zone opening to prevent feeding of material when the clearing element is extended and to permit feeding of material through the opening when the clearing element is retracted.

18. The apparatus of claim 3, wherein at least one of said upper chambers is provided with shredding roller means positioned adjacent the discharge or transfer zone opening.

19. The apparatus of claim 17, wherein said elongate chamber is formed with a tapering cross-section to compensate for reduction in volume of the material during composting.

20. A composting bin apparatus for aerobic decomposition and drying of organic waste material comprising: at least one elongated composting passageway chamber comprising first and second end walls and longitudinal side walls enclosing said chamber, feed opening means at the top of the chamber adjacent said first end, discharge or transfer opening means at the bottom of the chamber adjacent said second end; means for intermittently feeding substantially equal portions or charges of material through said feed opening; clearing element means mounted at the first end wall of the chamber, said clearing element means constructed and arranged for reciprocal extension and retraction for pushing a portion of material received at the feed opening away from the opening, compacting successive portions against each other, and stepwise advancing said portions through the composting passageway chamber; means for extending and retracting said clearing element over a stroke the dimension of said feed opening; means for aerating the material as it advances along the passageway chamber; said chamber constructed and arranged for intermittently discharging or transferring portions from the discharge or transfer opening after the length of the chamber is filled.

21. The composting bin apparatus of claim 20, comprising a plurality of composting passageway chambers located one below the other in a multi-level construction of successive upper and lower chambers, the discharge or transfer opening of an upper chamber positioned and aligned over the feed opening of a lower chamber, and with next adjacent chambers oriented in opposite directions.

22. The composting apparatus of claim 20 or 21, wherein each chamber comprises a plurality of sections spaced along the passageway chamber, each section further comprising separate aerating means, separate heating means separate venting means for segregated venting of reaction gases by section, and gas analysis means for analyzing separately the reaction gas generated by section for individualized control of the aeration and heating.

* * * * *